July 7, 1936.  A. E. RUTTER  2,046,851
DISK HARROW
Filed Sept. 14, 1935   2 Sheets-Sheet 2

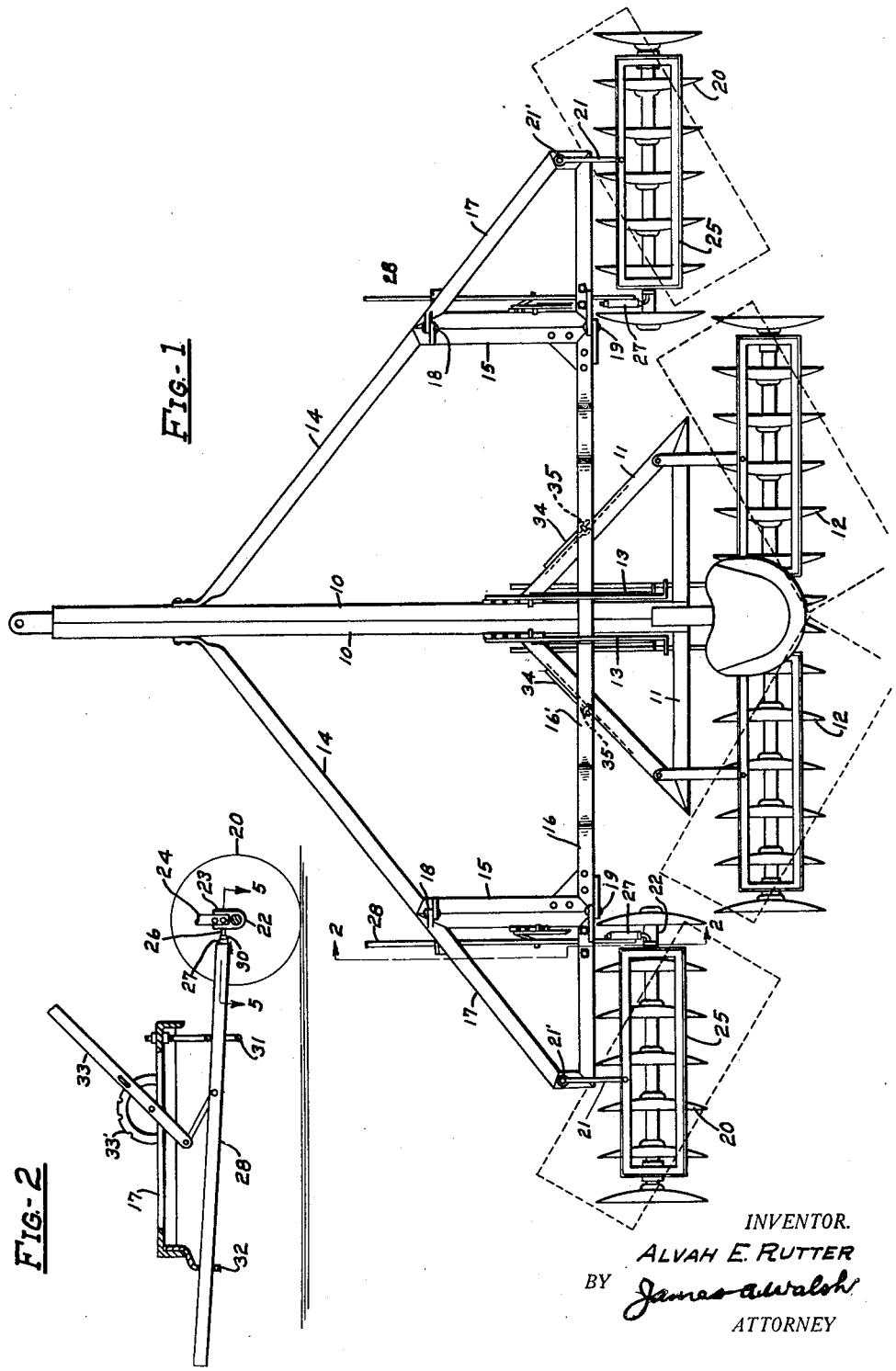

INVENTOR.
ALVAH E. RUTTER
BY James A. Walsh
ATTORNEY

Patented July 7, 1936

2,046,851

UNITED STATES PATENT OFFICE 2,046,851

DISK HARROW

Alvah E. Rutter, Rockford, Ill., assignor to J. I. Case Company, Racine, Wis., a corporation Application September 14, 1935, Serial No. 40,534

13 Claims. (Cl. 55—83)

This invention relates to improvements in disk harrows of the multiple gang type and more specifically to harrows embodying gangs of such dimensions that the overall width of the implement prohibits convenient storage or passage through ordinary gateways or entrances to buildings. As commonly practiced, it is necessary at considerable loss of time to laboriously dismantle portions of the implement before passing through narrow passageways, and also for storage.

Figure 3:
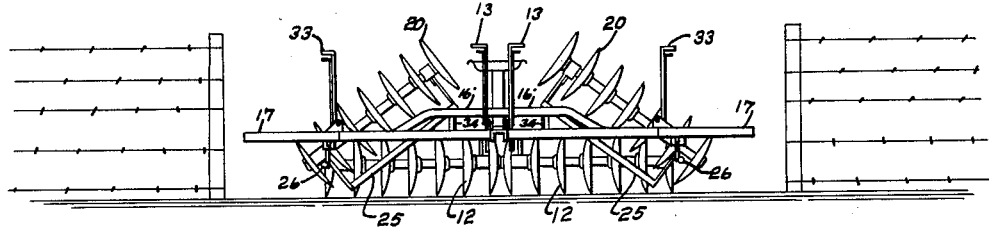
Figure 4:
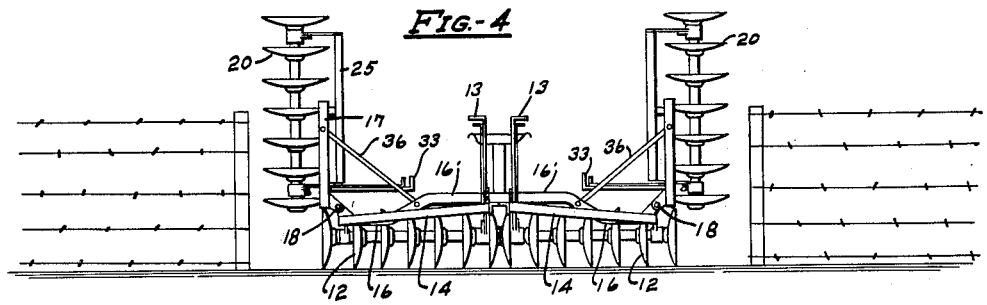
Figure 5:
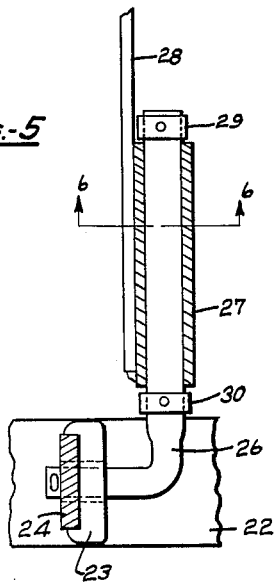
Figure 6:
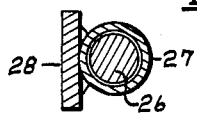

The objects of my invention are to provide means whereby the implement may be expeditiously folded to permit passage through the desired gate or building entrance, also to provide means whereby the implement may be folded to either of two different widths, and other objects will be hereinafter disclosed in connection with the accompanying drawings in which:

Fig. 1 is a plan elevation of a multiple gang disk harrow in transport position; Fig. 2, a sectional view taken on dotted lines 2—2 in Fig. 1; Fig. 3, a view showing the implement folded in my preferred manner when viewed from the front; Fig. 4, a front elevation showing the modified method of folding the outer gangs; Fig. 5, a sectional view taken on dotted lines 5—5 in Fig. 2, and Fig. 6 is a sectional view taken on dotted lines 6—6 in Fig. 5.

In said drawings the numeral 10 indicates the forwardly extending frame members of a disk harrow embodying a sub-frame 11 having associated therewith a pair of rear disk gang frames 12, the angularity of which is adjustable by levers 13, all of common and well known construction. At the forward end of frame member 10 I fasten converging main frame members 14, side members 15 and a cross-over member 16 which is arched at 16' to clear the sub-frame structure, said members 10, 14, 15, and 16, constituting the main frame of the implement, and as both sides of the implement are identical only one will be described in detail. At both sides of the main frame a triangular shaped main frame extension 17 is pivotally connected to members 14, 16, as at 18 and 19, the said extension having a gang 20 pivotally fastened thereto by a link 21, as at 21', the inner end of which gang has a bearing 22 formed with an arm 23 to which a vertical support 24 is secured for carrying the disk gang frame or carrier 25, as shown in Fig. 2.

Through the arm 23, I pivotally mount a forwardly extending shaft 26 which is rotatably mounted preferably in a tube 27 forming a bearing welded or otherwise fastened to a longitudinally reciprocating pull-bar 28, the shaft 26 having stops 29 and 30 to prevent its longitudinal movement in the tube 27, as in Fig. 5. The said pull-bar extends forwardly and is supported by suitable guides 31, 32, Fig. 2, and has associated therewith conventional means as lever 33 and quadrant 33' mounted upon the main frame extension 17 for adjusting the gang 20 to the desired angular position.

During operation of the harrows the gangs are in the angular position shown by the dotted lines, and ordinarily for transportation the gangs are adjusted by their respective adjusting levers so as to be in the full line position shown in Fig. 1. When it is necessary to pass through, for example, a gateway having a width of twelve feet, with my improved harrow, a pair of supports 34 pivotally fastened, at 35, to the sub-frame 11, are raised to a vertical position, the upper ends thereof being a slight distance below the under side of the arched portion 16' of the cross-member 16. The outer gangs 20 are then disconnected from the links 21 after which the outer ends of the gangs are raised so as to cause the unit to rotate about the pivotal connection formed by the shaft 26 and tube 27. The gangs are rotated until the disk gang frame 25 rests upon the sub-frame 11, causing the outer end of the gang to be towards the center of the implement. After the two outer gangs have been folded as described, the arched portion 16' of the cross-over frame 16 will settle upon the upper ends of supports 34 and thereby sustain the disks sufficiently above the ground surface to prevent dragging, when the rear gangs 12 will carry the entire weight of the implement.

If it is necessary to pass through a gate of less width than twelve feet, the unit is folded as shown in Fig. 4. The main frame extension 17, gang 20 and associated controls are, as a unit, raised to a vertical position by pivoting the extension frame about the points 18 and 19, maintaining the entire assembly in its vertical position by suitable braces, as at 36. When the gangs are raised to the vertical position as stated, the arched portion 16' will rest directly upon the upper surface of sub-frame 11, causing the ends of the cross frame 16 to be on a lower plane than the other frame members.

In practice I have demonstrated that a harrow embodying my improvements can be quickly reduced in width to pass through gateways and the like, and as readily adjusted to normal width for field work, at material saving in time and labor, and which is capable of reduction to various widths in the manner described.

I claim as my invention:

1. In an implement of the class described having a main frame, a disk gang frame pivotally connected to the main frame, a pull-bar pivotally connected to the gang frame and reciprocable in relation to the main frame, means on the main frame engaging the pull-bar for actuating the latter to adjust the gang in angular relation to the main frame, and bearing means connecting said pull-bar and said gang frame for supporting said gang frame on said pull-bar for upward swinging movement for transportation.

2. In an implement of the class described having a main frame, a disk gang frame pivotally connected to the main frame, a reciprocating pull-bar pivotally connected to the gang frame whereby the latter may be swung vertically to be supported on the implement, and means engaging the pull-bar for adjusting the gang frame in angular relation to the main frame when said gang frame is adjusted to operating position on the ground.

3. In an implement of the class described having a main frame and an extension frame, a disk gang frame pivotally connected to the extension frame, a shaft pivotally connected to one end of the gang frame, a bearing in which the shaft is pivotally mounted, a pull-bar connected to and supporting said bearing whereby said disk gang frame may pivot about said pull-bar for folding for transportation, said pull-bar extending forwardly in relation to the main frame, means for reciprocating said pull-bar for adjusting the angularity of said gang, and said extension frame and gang frame being adapted to be swung vertically in relation to the main frame as an alternative method of folding for transportation, and means connecting the main and gang frames for sustaining the latter and the extension frame in vertical position.

4. In an implement of the class described having a main frame, an extension frame pivotally connected to the main frame, a disk gang frame pivotally connected to the extension frame, a pull-bar pivotally connected to the gang frame and extending forwardly in relation to the main frame, said extension frame and gang frame being adapted to be swung vertically in relation to the main frame, and means connecting the main and gang frames for sustaining the latter and the extension frame in vertical position.

5. In an implement of the class described having a main frame, a sub-frame connected with the main frame, an extension frame pivotally connected to the main frame, a disk gang frame releasably connected to the extension frame, and means pivotally connecting the gang frame to the extension frame whereby the latter frames may be together vertically adjusted in relation to the main frame for folding for transportation, and also when released said gang frame may be independently vertically adjusted relatively to the extension frame to be positioned on the sub-frame for an alternative method of folding for transportation.

6. In an implement of the class described having a main frame including an arched cross member, a sub-frame beneath the cross-member and connected with the main frame, means mounted on the sub-frame for supporting the cross member, an extension frame pivotally connected to the main frame, and a disk gang frame pivotally connected to the extension frame and adapted to be swung vertically together with or independently of the extension frame in relation to the main frame.

7. In an implement of the class described having a main frame including a side member, a substantially triangular extension frame pivotally connected to said member for swinging movement in a vertical plane, a disk gang frame connected to the extension frame, a longitudinally reciprocating pull-bar pivotally connected to the gang frame, means on the extension frame for guiding the pull-bar in its movements, and other means on the extension frame connected to the pull-bar for actuating the latter.

8. In an implement of the class described having a main frame comprising forwardly extending, converging, side and cross-over members, a sub-frame connected with the main frame, disk gangs connected to the sub-frame, levers on the main frame for controlling the movements of the gangs, an extension frame pivotally connected to the main frame, a disk gang pivotally connected to the extension frame, means on the extension frame for controlling the movement of the disk gang including bearing means about which said gang may pivot, and releasable means connecting the gang and extension frame whereby when disconnected said gang may be swung vertically about said bearing means and positioned on the sub-frame to reduce the width of the implement.

9. In an implement of the class described having a frame, a pull-bar carried by said frame for longitudinal movement relatively thereto, a shaft extending axially of said pull-bar, a disk gang carrier pivotally connected to said shaft, bearing means interposed between said pull-bar and said shaft whereby said disk gang carrier may be swung upwardly about said shaft and supported thereby for transportation, a link pivotally connecting said disk gang carrier with said frame at a point spaced from said shaft, and means for longitudinally moving said pull-bar for adjusting the angle of said disk gang carrier relatively to said frame when said disk gang carrier is down.

10. In an implement of the class described having a main frame and an extension frame, a pull-bar supported by said extension frame for longitudinal movement relatively thereto, a shaft extending axially of said pull-bar, a disk gang frame pivotally connected to said shaft, bearing means interposed between said pull-bar and said shaft whereby said disk gang carrier may be swung upwardly about said shaft and supported thereby for transportation, a link pivotally connecting said disk gang frame with said extension frame at a point spaced from said shaft, and means for longitudinally moving said pull-bar for adjusting the angle of said disk gang frame relatively to said extension frame when said disk gang frame is down, said extension frame being pivotally connected with said main frame whereby to be swung upwardly together with said disk gang frame, and without relative movement between said disk gang frame and said extension frame, to provide an alternative manner of folding said implement for transportation.

11. In an implement of the class described a main frame and a sub-frame, a plurality of disk gangs supporting said main frame, and other disk gangs supporting said sub-frame, said main frame having a portion disposed above said sub-frame, means for raising the first mentioned disk gangs out of contact with the ground whereby their support is removed from said main frame, and a support element movable into and disposed in position between said sub-frame and said main frame, whereby said main frame may be supported from said sub-frame when said first mentioned gangs are raised.

12. In an implement of the class described having a main frame, an extension frame pivotally connected to the main frame, a disk gang frame pivotally connected to the extension frame, a pull-bar extending forwardly in relation to the main frame, a shaft pivotally connected to said gang frame, bearing means interposed between said pull-bar and shaft for swinging movement of said disk gang frame about said pull-bar as a support, for folding for transportation, said extension frame and gang frame being adapted to be swung upwardly in relation to the main frame about the pivotal connection between said main frame and said disk gang frame to provide an alternative manner of folding for transportation.

13. In an implement of the class described having a frame and a disk gang carrier, a pull-bar extending forwardly relatively to said frame and pivotally connected to said disk gang carrier, a guide carried by said frame and providing an aperture for said pull bar of a size to permit limited up-and-down movement of the bar, whereby said bar may follow irregular movements of the disk gang carrier caused by uneven ground and may be supported in said guide when the carrier is swung upwardly about and supported by said pull-bar for transportation.

ALVAH E. RUTTER.